United States Patent
Guo et al.

(10) Patent No.: US 8,923,374 B2
(45) Date of Patent: Dec. 30, 2014

(54) METHOD AND ARRANGEMENT OF DELAY CALIBRATION FOR ORTHOGONAL FREQUENCY DIVISION MULTIPLEXING (OFDM) SYSTEM

(75) Inventors: Zhiheng Guo, Beijing (CN); Qingyu Miao, Beijing (CN)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 259 days.

(21) Appl. No.: 13/518,691

(22) PCT Filed: Dec. 28, 2009

(86) PCT No.: PCT/CN2009/001561
§ 371 (c)(1),
(2), (4) Date: Jul. 24, 2012

(87) PCT Pub. No.: WO2011/079406
PCT Pub. Date: Jul. 7, 2011

(65) Prior Publication Data
US 2012/0281744 A1    Nov. 8, 2012

(51) Int. Cl.
*H04B 3/46* (2006.01)
*H04L 27/26* (2006.01)

(52) U.S. Cl.
CPC ........ *H04L 27/2657* (2013.01); *H04L 27/2672* (2013.01); *H04L 27/2671* (2013.01)
USPC ......................................................... 375/224

(58) Field of Classification Search
CPC ............ H04L 27/2657; H04L 27/2672; H04L 27/2671
USPC ......................................................... 375/224
See application file for complete search history.

(56) References Cited

U.S. PATENT DOCUMENTS

| | | |
|---|---|---|
| 2002/0176354 A1 | 11/2002 | Chiodini |
| 2007/0002749 A1 | 1/2007 | Sondur |
| 2007/0025236 A1* | 2/2007 | Ma et al. ...................... 370/208 |
| 2009/0046003 A1* | 2/2009 | Tung et al. ................... 342/174 |
| 2009/0091362 A1* | 4/2009 | Pellerano et al. ............ 327/158 |
| 2009/0274112 A1* | 11/2009 | Ma et al. ...................... 370/330 |
| 2012/0269136 A1* | 10/2012 | Seo et al. ..................... 370/329 |

FOREIGN PATENT DOCUMENTS

CN      101286969 A      10/2008

* cited by examiner

*Primary Examiner* — Juan A Torres
(74) *Attorney, Agent, or Firm* — Murphy, Bilak & Homiller, PLLC

(57) ABSTRACT

A method and arrangement in a network entity of delay calibration for an Orthogonal Frequency-Division Multiplexing (OFDM) system in a mobile communication system. The delay calibration technique as disclosed includes estimating a time delay difference according to a phase difference between two adjacent sub-carriers, dividing the estimated time delay difference into a coarse time delay and a fine time delay, and compensating the coarse time delay in time domain and the fine time delay in frequency domain respectively.

17 Claims, 3 Drawing Sheets

METHOD AND ARRANGEMENT OF DELAY CALIBRATION FOR ORTHOGONAL FREQUENCY DIVISION MULTIPLEXING (OFDM) SYSTEM

TECHNICAL FIELD

The present invention relates to delay calibration, and in particular, to an arrangement and method for delay calibration for an orthogonal frequency division multiplexing (OFDM) system.

BACKGROUND

In Time-Division Synchronous Code-Division Multiple-Access (TD-SCDMA) and Long-Term Evolution (LTE) systems, an adaptive antenna array is used to increase the system coverage and capacity, etc., which is a group of antenna elements located very close to each other (e.g. half of wave length of the carrier frequency). The antenna array can send a target signal directed to a target user with low interference to other users by means of low transmitting power in the direction of other users. To make sure the signal directed to the expected user, the delay, phase and amplitude of each antenna channel have to keep identical during the signal transmitting or receiving. The beamforming technology is useful in sending carefully calculated signal on each antenna to make the transmitted signal in the air be directed to the target user.

In reality, the delay, phase and amplitude of each antenna channel cannot be identical naturally, because of the temperature, thermal noise, inconsistency of components, etc. The above uncertainties lead to random delay, random phase and amplitude of each antenna channel.

However, for many applications of an adaptive antenna array, it is required that all elements of the antenna array have equal gain and phase characteristics, so calibrating the individual elements/TX (RX) path is of utmost importance. In the 3GPP LTE-TDD standard, an OFDM system is adopted for the downlink with multiple antennae. Beamforming is also one of the critical features for the system. To obtain a beamforming gain with symmetrical downlink and uplink wireless channels, the gain and phase characteristics of multiple antennae should remain identical.

In the RF part of a real system, the amplitude, phase and delay of various antenna channels (including digital upper converter (DUC), digital down converter (DDC), digital to analogue converter (DAC), and analogue to digital converter (ADC) etc) are always different from channel to channel in both the downlink direction and the uplink direction, as shown in FIG. 1. In the downlink direction, to obtain the beamforming gain, it is important to calibrate the antenna RF channels to make the channel response of each channel the same. Similarly, to use the estimated uplink wireless channel to generate a beamforming vector, the channel response of the RF part in the uplink direction should also be the same. Therefore a calibration in the uplink and downlink is needed. To calibrate the delay, amplitude and phase differences of the channel, a delay difference are estimated first. Thus it becomes necessary to determine how to estimate and calibrate the delay difference of antenna RF channels.

In the OFDM system, besides the amplitude and the phase difference of the antennas, the time delay difference also adversely affects the consistency in channel response. Moreover, the time delay difference tends to more significantly affect the higher frequency band and the lower frequency band in the signal bandwidth, since the delay difference results in phase difference in the frequency domain. Thus, the higher/lower the frequency band is, the larger the phase difference will be.

In the OFDM system, the conversion from the time domain reference data $x=[x_0, x_1, \ldots, x_{N-1}]$ to frequency domain data $y=[y_0, y_1, \ldots, y_{N-1}]$ is expressed in the following Fast Fourier Transform (FFT) operation:

$$y_k = \sum_{n=0}^{N-1} x_n \exp\left(-j \times \frac{2\pi}{N} \times n \times k\right),$$

$$0 \leq k \leq N-1.$$

If there is an amplitude, phase or delay error, the frequency domain signal should be expressed as follows:

$$r = [r_0, r_1, \ldots, r_{N-1}]$$

$$r_k = h \times \sum_{n=0}^{N-1} x_n \exp\left(-j \times \frac{2\pi}{N} \times (n + \Delta t/T_s) \times k\right) + v_k$$

$$= h \times \exp\left(-j \times \frac{2\pi}{N} \times k \times \Delta t/T_s\right) \times \sum_{n=0}^{N-1} x_n \exp\left(-j \times \frac{2\pi}{N} \times n \times k\right) + v_k$$

Then it can be concluded that $$r_k = h \times \exp\left(-j \times \frac{2\pi}{N} \times k \times \Delta t/T_s\right) \times y_k + v_k;$$

wherein N is the number of sub-carriers; h is the channel response (phase and amplitude) difference to the reference antenna/TX (RX) path; $\Delta t$ is the time delay difference relative to the reference antenna; and Ts is the interval of samples.

Thus the phase shift of k-th sub-carrier in the frequency domain is:

$$\theta_k = -\frac{2\pi}{N} \times k \times \Delta t/T_s + \varphi_{h,k} + \varepsilon_k;$$

wherein $\varphi_{h,k}$ is the phase shift caused by h, which is constant in the whole working frequency band as designed; and $\varepsilon_k$ is the phase shift caused by the noise. According to the signal processing theory, k=0 represents the middle frequency (carrier frequency) in the signal band; k=N/2−1 represents the lowest frequency; and k=N/2 represents the highest frequency in the signal frequency band.

Therefore, it can be concluded that the delay difference will cause a larger phase shift in the higher/lower frequency band, which will reduce the beamforming gain. Consequently, it is not only necessary to estimate the delay difference in frequency domain, but also necessary to compensate for this delay difference. There also exists need to improve the accuracy in the delay difference estimation.

SUMMARY

The object of the present invention is to provide a method and arrangement of delay calibration for an orthogonal frequency division multiplexing system to estimate and compensate the time delay difference.

According to the first aspect of the embodiment of the present invention, there is provided a method of delay calibration for an OFDM system in a mobile communication system, comprising: estimating a time delay difference according to a phase difference between two adjacent sub-carriers; dividing the estimated time delay difference into a coarse time delay and a fine time delay; and compensating the coarse time delay in time domain and the fine time delay in frequency domain respectively.

According to the second aspect of the embodiment of the present invention, there is provided a arrangement of delay calibration for an OFDM system in a mobile communication system, comprising: an estimating unit configured to estimate a time delay difference according to a phase difference between two adjacent sub-carriers; a dividing unit configured to divide the estimated time delay difference into a coarse time delay and a fine time delay; and a compensating unit configured to compensate the coarse time delay in a time domain and the fine time delay in a frequency domain respectively.

According to the third aspect of the embodiment of the present invention, there is provided a mobile communication system, comprising the arrangement according to the second aspect of the embodiment of the present invention.

The invention is described in greater details below with reference to the accompanying drawings and the illustrative embodiments.

DETAILED DESCRIPTION

Figure 1:
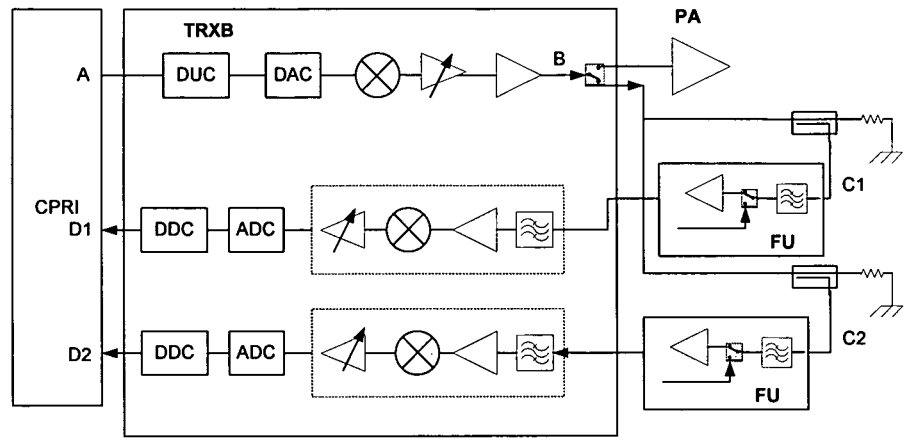
FIG. 1 is a schematic view of the RF part of an OFDM system in prior art.
Figure 2:
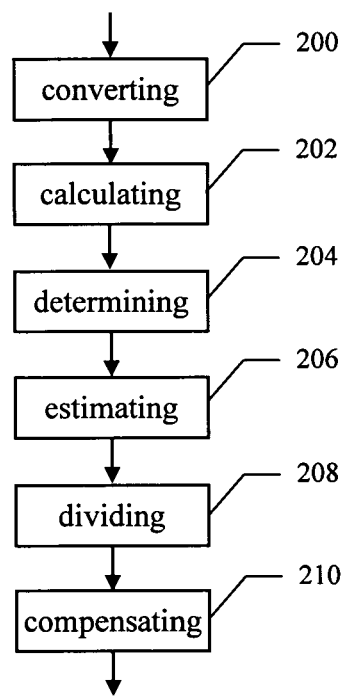
FIG. 2 is a schematic diagram illustrating the flow of the method according to an embodiment of the present invention.

The method according to an embodiment of the present invention mainly includes an estimating step 206, a dividing step 208 and a compensating step 210. In other embodiments, the method further includes a converting step 200, a calculating step 202, and a determining step 204 optionally, as shown in FIG. 2. The steps are illustrated below in greater details.

In step 200, the following signal is transmitted as a training signal. That is, $s=[s_0, s_1, \ldots, s_{M-1}]$ is the reference signal in the frequency domain, and then it is converted to the time domain by the Inverse Fast Fourier Transform (IFFT) operation as follows:

$$e=[e_0,e_1,\ldots,e_{N-1}]=IFFT[s_0,s_1,\ldots,s_{M/2-1},0,0,\ldots,0,0,s_{M/2},s_{M/2+1},\ldots,s_{M-1}].$$

A cyclic prefix and cyclic postfix are added before transmission as $$x=[x_0,x_1,\ldots,x_{N+L+Q-1}]=[e_{N-L},e_{N-L},\ldots,e_{N-1},e_0,e_1,\ldots,e_{N-1},x_0,x_1,\ldots,x_{Q-1}];$$

where L is the prefix length; Q is the postfix length; and M is the number of used sub-carriers for reference signal.

In step 202, the received signal $r=[r_0, r_1 \ldots, r_{N+L+Q-1}]$ is processed to remove the prefix and postfix and to be converted from the time domain back to the frequency domain, as the following equation indicates, $$r'=[r'_0,r'_1,\ldots,r'_{N-1}]=FFT[r_L,r_{L+1},\ldots,r_{N+L-1}].$$

Thus, the estimated phase shift of the k-th sub-carrier is $$\theta_m = \begin{cases} \phi(r'_m/s_m), & 0 \le m < M/2 \\ \phi(r'_m/s_{N-m}), & N-M/2 \le m < N-1. \end{cases}$$

In step 204, the phase difference between two adjacent carriers caused by a timing error is, using the linear fitting algorithm, determined as $$\varphi = \frac{\sum_{m\in g,m=0}^{N_0-1}\sum_{m\in g,m=0}^{N_0-1}\theta_m - N'\sum_{m\in g,m=0}^{N_0-1}m\theta_m}{\left(\sum_{m\in g,m=0}^{N_0-1}m\right)^2 - N'\sum_{m\in g,m=0}^{N_0-1}m^2};$$

$$g = \{m \mid (0 \le m < M/2) \text{ or } (N-M/2 \le 2m < N-1)\};$$

$$N' = \text{length}(g \cap \{m \mid 0 \le m < N_0-1\});$$

wherein $N_0$ is the maximum sub-carrier index that is used to perform the linear fitting.

In step 206, the time delay difference is estimated as $$\Delta t = \frac{-N \times \varphi \times T_s}{2\pi}.$$

In step 208, the estimated delay difference is divided into two parts, i.e. the coarse time delay and the fine time delay. Supposing that $\Delta t=\Delta t_1+\Delta t_2$, $\Delta t_1$ is called a coarse time delay and $\Delta t_2$ is called a fine time delay. The coarse time delay $\Delta t_1$ is the times of Ts/P, wherein P is the oversampling rate in FPGA and P≥1. Specifically, the coarse time delay $\Delta t_1$ and the fine time delay $\Delta t_2$ can be expressed as follows:

$$\Delta t_1=\lceil \Delta t \times P/T_s \rceil \times T_s/P;$$

$$\Delta t_2=\Delta t-\Delta t_1, \text{ and } -T_s/P < \Delta t_2 \le 0;$$

in which $\Delta t$ is the estimated time delay difference; Ts is the interval of samples; P is the oversampling rate and P≥1; and $\lceil x \rceil$ denotes to find the closest integer which is not smaller than x.

In step 210, the coarse time delay $\Delta t_1$ is compensated in the time domain by adjusting the delay in a field programmable gate array (FPGA) or baseband at the oversampling part, and the fine time delay $\Delta t_2$ is compensated in the frequency domain by applying a phase shift $\exp(j\times 2\pi \times k \times \Delta t/T_s/N)$ to each carrier. For example, during compensating the coarse time delay $\Delta t_1$, if $\Delta t_1 > 0$, the first $\lceil \Delta t \times P/T_s \rceil$ oversampled data in the FPGA buffer is removed before the transmission, and if $\Delta t_1 <= 0$, then a number $\lceil \Delta t \times P/T_s \rceil$ of zeros are inserted before the oversampled data prior to the transmission.

In another embodiment, the above steps may be repeated for multiple times, for example two times, with different maximum sub-carrier indexes being provided for the linear fitting at each time. For instance, a first sub-carrier index is provided for the first time of linear fitting to determine a phase difference between two adjacent sub-carriers caused by a timing error whereby a time delay difference is estimated. A second sub-carrier index, greater than the first sub-carrier index, is provided for the second time of linear fitting to determine a phase difference between two adjacent sub-carriers caused by a timing error whereby a time delay difference is estimated. A smaller sub-carrier index $N_0$ results in an increased range of the delay estimation but a decreased accuracy; whereas a larger sub-carrier index $N_0$ results in an increased delay estimation accuracy but a decreased range of the delay estimation.

So far, the time delay difference has been compensated, and then the amplitude and phase differences could be calibrated using a periodical calibration process.

Figure 3:
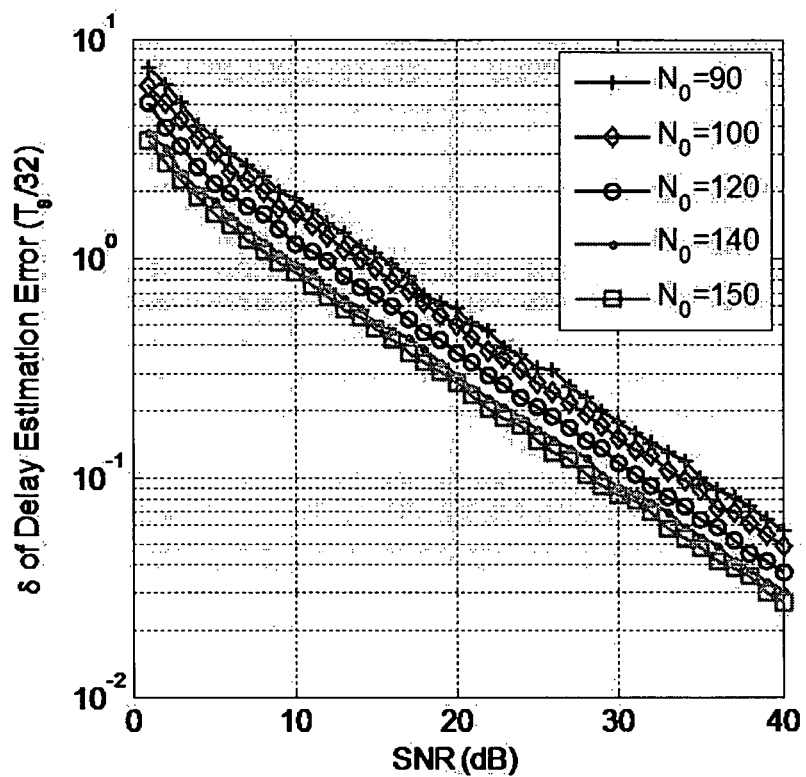
FIG. 3 is a schematic view illustrating standard deviation of delay difference estimation error against the SNR.

FIG. 3 shows the standard deviation of the delay difference estimation error against the SNR. The simulation result is based on the following parameters.

TABLE 1

| simulation parameters | |
|---|---|
| Sampling Rate | 30.72 MHz |
| Bandwidth | 20 MHz |
| Sub-carrier Spacing | 15 kHz |
| FFT Size | 2048 |
| Number of sub-carriers used for training sequence | 1200 |

It can be seen from the simulation result that when 150 sub-carriers are used for the delay estimation at a SNR of 20 dB, the standard deviation of the estimation error will be about 0.01 Ts, which can satisfy the requirement of the beamforming.

Figure 4:
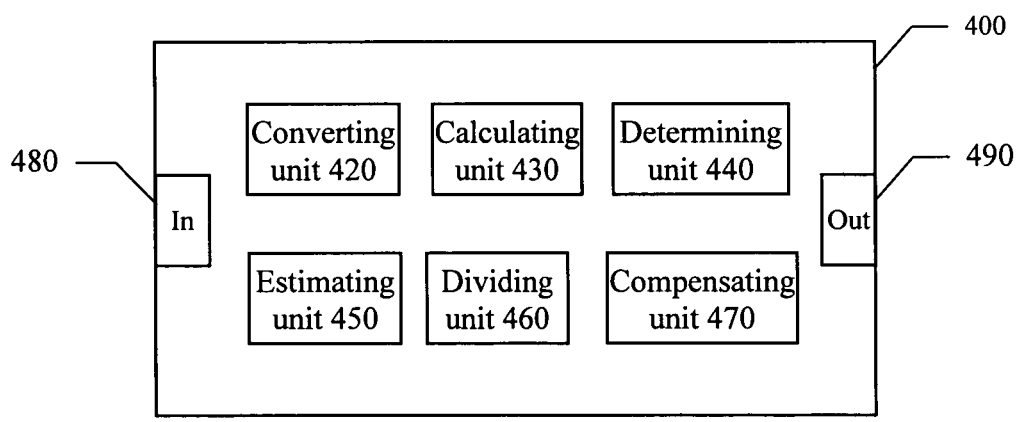
FIG. 4 shows schematically a arrangement of the delay calibration for an OFDM system according to an embodiment of the present invention.

FIG. 4 shows schematically a arrangement 400 of the delay calibration for an OFDM system according to an embodiment of the present invention, which substantially includes an estimating unit 450, a dividing unit 460 and a compensating unit 470. In other embodiments, the arrangement 400 further includes a converting unit 420, a calculating unit 430, a determining unit 440, and a input unit 480 and output unit 490 optionally.

The converting unit 420 is configured to convert a reference signal in the frequency domain to a signal in the time domain using the IFFT operation, and then add a cyclic prefix and cyclic postfix to the converted signal for transmission. The calculating unit 430 is configured to calculate a phase shift of each of the sub-carriers according to a received signal which has the cyclic prefix and cyclic postfix removed and is converted from the time domain back to the frequency domain. The determining unit 440 is configured to determine, based on the phase shifts of the sub-carriers, the phase difference between two adjacent sub-carriers caused by a timing error using a linear fitting algorithm. The estimating unit 450 then estimates a time delay difference according to the phase difference between two adjacent sub-carriers. Subsequently, in the dividing unit 460, the estimated time delay difference is divided into a coarse time delay and a fine time delay. Finally, the compensating unit 470 compensates the coarse time delay and the fine time delay in the time domain and frequency domain respectively. The input unit 480 and output unit 490 are used to receive the reference signal in the frequency domain and ouput the calibrated signal.

Figure 5:
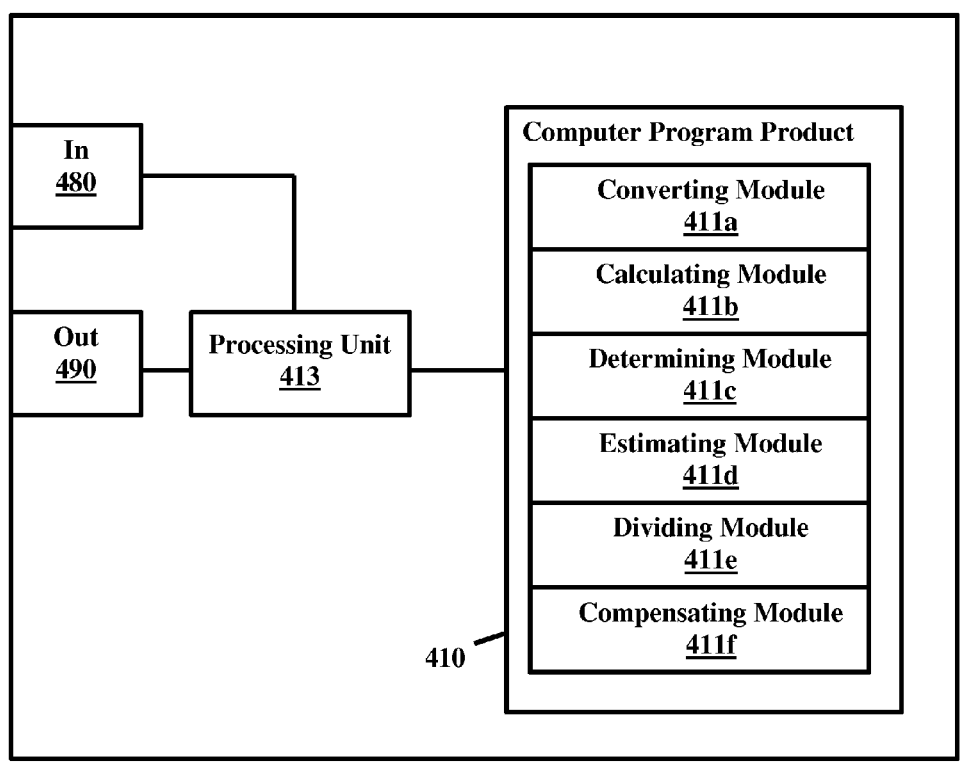
FIG. 5 schematically shows an alternative embodiment of the arrangement illustrated in FIG. 4.

FIG. 5 schematically shows an alternative embodiment of the arrangement 400 illustrated in FIG. 4, which comprises a processing unit 413 such as a DSP (Digital Signal Processor). The processing unit 413 can be a single unit or a plurality of units to perform different steps as illustrated in FIG. 2. The arrangement 400 also comprises the input unit 480 for receiving the reference signal in the frequency domain and output unit 490 for outputting the calibrated signal. The input unit 480 and output unit 490 may be arranged as one in the hardware of the arrangement 400.

Furthermore, the arrangement 400 comprises at least one computer program product 410 in the form of a non-volatile memory, e.g. an EEPROM, a flash memory and a disk drive. The computer program product 410 comprises a computer program 411, which comprises code means which when run causes the arrangement 400 to perform the steps of the procedure described in conjunction with FIG. 2.

Hence in the exemplary embodiments described, the code means in the computer program 411 of the arrangement 400 comprises a converting module 411a for converting a reference signal in the frequency domain to a signal in the time domain using the IFFT operation and then adding a cyclic prefix and cyclic postfix to the converted signal for transmission; a calculating module 411b for calculating a phase shift of each of the sub-carriers according to a received signal which has the cyclic prefix and cyclic postfix removed and is converted from the time domain back to the frequency domain; a determining module 411c for determining, based on the phase shifts of the sub-carriers, the phase difference between two adjacent sub-carriers caused by a timing error using a linear fitting algorithm; an estimating module 411d for estimating a time delay difference according to the phase difference between two adjacent sub-carriers; a dividing module 411e for dividing the estimated time delay difference into a coarse time delay and a fine time delay; and a compensating module 411f for compensating the coarse time delay and the fine time delay in the time domain and frequency domain respectively. The modules 411a-f essentially perform the steps of procedure illustrated in FIG. 2 to emulate the arrangement described in FIG. 4. In other words, when the different modules 411a-f are run on the processing unit 413, they correspond to the corresponding units 420, 430, 440, 450, 460 and 470 of FIG. 4 respectively.

Although the code means in the embodiment disclosed above in conjunction with FIG. 5 are implemented as computer program modules which when run on the arrangement 400 causes the arrangement 400 to perform steps described above in the conjunction with FIG. 2, at least one of the code means may in alternative embodiments be implemented at least partly as hardware circuit.

The arrangement according to any of the above embodiments can be implemented in a user equipment and/or a radio base station of a mobile communication system by hardware, software or firmware, or the combination thereof, which would be appreciated by persons skilled in the art according to the teachings of the present invention and thus is not described in detail herein.

According to the method and arrangement of embodiments of the present invention, the pre-calibration is facilitated, since it can be finished at the time of cell setup. The time delay difference is compensated in both time domain and frequency domain to increase the accuracy of the compensation. The delay error is estimated in time domain using linear fitting algorithm, thereby increasing accuracy. Meanwhile, the delay compensation is separated from the phase and amplitude compensation, so only the random phase and amplitude need to be calibrated in a periodical manner, whereby the amplitude and phase calibration accuracy are increased and the complexity is reduced at the same time.

Although the disclosure has been described above in connection with the examples, it is not intended that the disclosure be limited to these specific embodiments. Those skilled in the art should understand that the described features, operations, or characteristics may be combined in any suitable manner in one or more embodiments. And the disclosure is susceptible to some modifications, transformations, and equivalent replacements, etc., which, without departing from the spirit and scope of the present disclosure, should fall within the protection scope of the present disclosure.

The invention claimed is:

1. A method, in a network entity, of delay calibration for an Orthogonal Frequency-Division Multiplexing (OFDM) system in a mobile communication system, the method comprising:
    estimating a time delay difference according to a phase difference between two adjacent sub-carriers;
    dividing the estimated time delay difference into a coarse time delay and a fine time delay; and
    compensating the coarse time delay in time domain and the fine time delay in frequency domain, respectively.

2. The method of claim 1, further comprising determining, using a linear fitting algorithm, the phase difference between two adjacent sub-carriers based on phase shifts of the sub-carriers.

3. The method of claim 1, wherein the coarse time delay $\Delta t_1$ and the fine time delay $\Delta t_2$ are expressed as follows:

$$\Delta t_1 = \lceil \Delta t \times P/T_s \rceil \times T_s/P,$$

$$\Delta t_2 = \Delta t - \Delta t_1, \text{ and } -Ts/P < \Delta t_2 \geq 0,$$

in which $\Delta t$ is an estimated time delay difference; Ts is an interval of samples; P is an oversampling rate and $P \geq 1$; and $\lceil x \rceil$ denotes to find the closest integer that is no smaller than x.

4. The method of claim 1, wherein the coarse time delay $\Delta t_1$ is compensated by adjusting the delay in a Field-Programmable Gate Array (FPGA) or baseband at a oversampling part.

5. The method of claim 1, wherein the fine time delay $\Delta t_2$ is compensated in the frequency domain by applying a phase shift $\exp(j \times 2\pi \times k \times \Delta t/T_s/N)$ to k-th carrier, in which $\Delta t$ is an estimated time delay difference; Ts is an interval of samples; and N is the number of the sub-carriers.

6. The method of claim 2, further comprising calculating a phase shift of each of the sub-carriers according to a received signal which has a cyclic prefix and cyclic postfix removed, and which is converted from the time domain to the frequency domain.

7. The method of claim 2, wherein the steps can be repeated for multiple times with different maximum sub-carrier indexes being provided for the linear fitting at each time.

8. The method of claim 4, wherein, during compensating the coarse time delay $\Delta t_1$, if $\Delta t_1 > 0$, the first $\lceil \Delta t \times P/T_s \rceil$ oversampled data in a FPGA buffer is removed before transmission, and if $\Delta t_1 <= 0$, then a number $\lceil \Delta t \times P/T_s \rceil$ of zeros are inserted before the oversampled data prior to transmission, in which $\Delta t$ is an estimated time delay difference; Ts is an interval of samples; P is an oversampling rate and $P \geq 1$; and $\lceil x \rceil$ denotes to find the closest integer that is no smaller than x.

9. The method of claim 6, further comprising converting a reference signal in the frequency domain to the time domain by an Inverse Fast Fourier Transform (IFFT) operation, and then adding the cyclic prefix and cyclic postfix for transmission.

10. The method of claim 7, wherein a first sub-carrier index is provided for the first time of linear fitting to determine a phase difference between two adjacent sub-carriers caused by a timing error whereby a time delay difference is estimated; and a second sub-carrier index, greater than the first sub-carrier index, is provided for the second time of linear fitting to determine a phase difference between two adjacent sub-carriers caused by a timing error whereby a time delay difference is estimated.

11. An arrangement, in a network entity, of delay calibration for an Orthogonal Frequency-Division Multiplexing (OFDM) system in a mobile communication system, the arrangement comprising:
    an estimating unit configured to estimate a time delay difference according to a phase difference between two adjacent sub-carriers;
    a dividing unit configured to divide the estimated time delay difference into a coarse time delay and a fine time delay; and
    a compensating unit configured to compensate the coarse time delay in a time domain and the fine time delay in a frequency domain respectively.

12. The arrangement of claim 11, further comprising a determining unit configured to determine, using a linear fitting algorithm, the phase difference between two adjacent sub-carriers based on phase shifts of the sub-carriers.

13. The arrangement of claim 11, wherein said network entity is a radio base station.

14. The arrangement of claim 11, wherein said network entity is an user equipment.

15. The arrangement of claim 12, further comprising a calculating unit configured to calculate a phase shift of each of the sub-carriers according to a received signal which has a cyclic prefix and cyclic postfix removed, and is converted from a time domain to a frequency domain.

16. The arrangement of claim 15, further comprising a converting unit configured to convert a reference signal in the frequency domain to the time domain by an Inverse Fast Fourier Transform (IFFT) operation, and then adding the cyclic prefix and cyclic postfix for transmission.

17. A mobile communication system, comprising:
    a user equipment; and
    a radio base station;
    wherein at least one of the user equipment and the radio base station comprises:
    an estimating unit configured to estimate a time delay difference according to a phase difference between two adjacent sub-carriers;
    a dividing unit configured to divide the estimated time delay difference into a coarse time delay and a fine time delay; and
    a compensating unit configured to compensate the coarse time delay in a time domain and the fine time delay in a frequency domain respectively.

* * * * *